(12) United States Patent
Klee et al.

(10) Patent No.: US 9,542,224 B2
(45) Date of Patent: Jan. 10, 2017

(54) USER SPACE FUNCTION EXECUTION FROM A KERNEL CONTEXT FOR INPUT/OUTPUT FILTERING FROM A THREAD EXECUTING IN THE USER SPACE

(71) Applicant: VMware, Inc., Palo Alto, CA (US)

(72) Inventors: Christoph Klee, Issaquah, WA (US);
Mukund Gunti, Sunnyvale, CA (US);
Adrian Drzewiecki, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 200 days.

(21) Appl. No.: 14/304,477

(22) Filed: Jun. 13, 2014

(65) Prior Publication Data

US 2015/0212867 A1 Jul. 30, 2015

Related U.S. Application Data

(60) Provisional application No. 61/933,734, filed on Jan. 30, 2014.

(51) Int. Cl.
| | |
|---|---|
| *G06F 3/00* | (2006.01) |
| *G06F 9/50* | (2006.01) |
| *G06F 9/52* | (2006.01) |
| *G06F 3/06* | (2006.01) |
| *G06F 9/54* | (2006.01) |

(52) U.S. Cl.
CPC ............... *G06F 9/50* (2013.01); *G06F 3/0605* (2013.01); *G06F 3/0659* (2013.01); *G06F 3/0673* (2013.01); *G06F 9/5005* (2013.01); *G06F 9/52* (2013.01); *G06F 9/545* (2013.01)

(58) Field of Classification Search
CPC ............ G06F 9/50; G06F 9/52; G06F 3/0605; G06F 3/0659
USPC ............................................. 711/109; 710/5
See application file for complete search history.

(56) References Cited

U.S. PATENT DOCUMENTS

| | | | | |
|---|---|---|---|---|
| 7,152,231 | B1 * | 12/2006 | Galluscio ................ | G06F 9/544 711/104 |
| 8,209,704 | B1 | 6/2012 | McCann et al. | |
| 8,261,265 | B2 * | 9/2012 | Chen ...................... | G06F 9/4426 718/1 |

(Continued)

OTHER PUBLICATIONS

Hutchinson et al., "The x-Kernel: An Architecture for Implementing Network Protocols", IEEE Transactions on Software Engineering, vol. 17, No. 1, Jan. 1991, 13 pages.

(Continued)

*Primary Examiner* — Tammara Peyton

(57) ABSTRACT

The approaches described herein implement execution of a user space operation from a kernel context. A thread, executing on a computing device, initializes a second kernel stack based on a first kernel stack. The computing device executes an operating system having a user space and a kernel space. The thread, executing in kernel space, performs a non-blocking call (e.g., an upcall) to execute an upcall function in user space, such as filtering input/output (I/O) requests. The upcall function may further call other user space functions or system calls. The system calls are performed using the second kernel stack. Upon termination of the upcall function, the thread continues execution on the first kernel stack in kernel space. For example, the thread handles the filtered I/O commands.

20 Claims, 13 Drawing Sheets

(56) References Cited

U.S. PATENT DOCUMENTS

2002/0091868 A1* 7/2002 Molnar .................. G06F 9/465
 719/310
2013/0024875 A1 1/2013 Wang

OTHER PUBLICATIONS

Danjean et al., "Controling Kernel Scheduling from User Space: an Approach to Enhancing Applications' Reactivity to 1/0 Events", In Proceedings of: High Performance Computing (HiPC), 1oth International Conference, 2003, 10 pages.
Bui, Hanh Thi Minh, Office Action, U.S. Appl. No. 14/304,480, mailed Sep. 22, 2016, 24 pages.

* cited by examiner

USER SPACE FUNCTION EXECUTION FROM A KERNEL CONTEXT FOR INPUT/OUTPUT FILTERING FROM A THREAD EXECUTING IN THE USER SPACE

CROSS-REFERENCE TO RELATED APPLICATION

This application claims the benefit of U.S. Provisional Application No. 61/933,734, filed Jan. 30, 2014, the entirety of which is hereby incorporated by reference herein.

This application is related to a U.S. patent application entitled "Synchronous User Space Function Execution from a Kernel Context", filed concurrently herewith, which is incorporated by reference herein in its entirety.

BACKGROUND

At the operating system level, a known mechanism for protecting data and functionality is to define a user space and a kernel space. Within the kernel space, privileged kernel and many device drivers are executed. In contrast, application software and some device drivers execute in the user space. In some systems, a user space function performs a system call to perform a certain action inside the kernel (e.g., in kernel space). After that action has been completed, the kernel returns control back to the calling user space function.

Signal handlers process asynchronous notifications or other signals that arise due to the occurrence of events, and this happens asynchronous to user space as well. However, with signal handlers, the kernel is not able to execute a user space function in user space at a point in time that the kernel determines is appropriate for its own control flow.

SUMMARY

One or more embodiments described herein implement synchronous execution of a user space operation from a kernel context. A thread, executing on a computing device, initializes a second kernel stack separate from a first kernel stack. The computing device executes an operating system having a user space and a kernel space. The thread, executing in kernel space, performs a non-blocking upcall to execute one or more functions in user space, such as input/output (I/O) filtering. If any of the functions executing in user space enter kernel space (e.g., a system call, interrupt handling, etc.), the initialized second kernel stack is used to service those functions. The first kernel stack is used upon return from the upcall from the perspective of the thread executing in kernel space. For example, the filtered I/O requests are issued through storage layers in kernel space (e.g., down the storage layers) and filtered I/O completions are passed back through the storage layers (e.g., up the storage layers) in kernel space.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
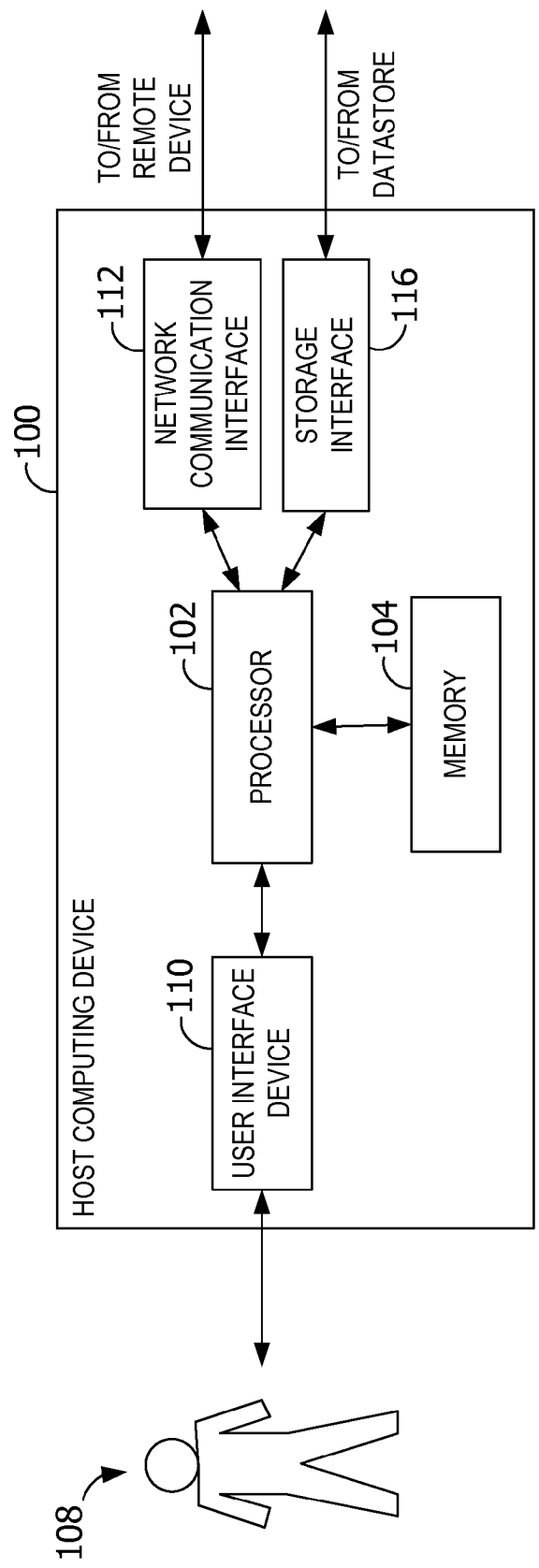
FIG. 1 is a block diagram of an exemplary host computing device.

Examples described herein provide an upcall mechanism that allows a kernel, from kernel space, to execute a user space function in user space synchronously (e.g., within the context of a single thread or other processing unit). After the user space function completes its execution, the kernel context continues execution as if the executed user space function was just another kernel function. In some embodiments, the user space function is not restricted in its execution in any way, as opposed to signal handlers. For example, the called user space function may call additional user space functions, perform other system calls, and the like.

Aspects of the disclosure are operable with systems having commands that originate inside the kernel rather than in user space. To enable a synchronous communication channel between kernel space and user space, some embodiments perform an upcall into user space to execute an upcall function, where the upcall appears to the kernel as a kernel function call that returns to its calling function after executing the upcall function. The upcall function is executed in user space, and the user space code is able to execute in an unrestricted manner, such as by performing all regular operations (e.g., calling other user level libraries, performing further system calls, and/or accessing thread local variables). To enable a return to kernel space after initiating execution of the upcall function in user space, the kernel stack from which the upcall originated is preserved. For example, a secondary kernel stack is created for use with all operations (e.g., regular system calls) that require a clean kernel stack while other operations execute in the upcall mode in user space. Further, the upcall function, executing in user space, uses a user space stack during execution.

Some examples of the upcall mechanism are faster to perform (e.g., less than 200 cycles) that other solutions such as signal handlers (e.g., greater than 2000 cycles). As such, these examples enable synchronous performance of some operations in kernel space and other operations in user space. For example, aspects of the disclosure perform input/output (I/O) command filtering in user space without affecting the stability of the underlying operating system while achieving close to in-kernel performance, as next described. However, other implementations of the disclosure are contemplated, including those unrelated to I/O command filtering.

In some of the I/O command filtering examples, I/O commands include networking I/O commands and storage I/O commands, although other I/O commands are contemplated. Aspects of the disclosure enable third parties, such as storage providers and/or network providers, to provide logic (e.g., as user space "plugins") for processing particular I/O commands. For example, some third parties provide disk encryption solutions as plugins to an I/O filter framework of the disclosure. The I/O filter framework, implementing the techniques described herein, enable the plugins to intercept every I/O command to and from the operating system to enable encryption and decryption.

To achieve desirable performance without adversely impacting the latency of an I/O request in an undesirable manner, the upcall mechanism in some of the I/O examples of the disclosure enable an I/O command that has been filtered in user space to be issued quickly down the storage layers in kernel space on the request path, and up the storage layers for I/O completion. That is, an upcall into user space is performed to filter the I/O commands and, after the filter has finished executing, the control flow returns to kernel space to issue the filtered I/O command(s) further down the storage layers in kernel space and completes them further up the storage layers for I/O completions. I/O completions include, for example, receiving data from storage when the I/O request is a READ request and receiving confirmation that data has been written to storage when the I/O request is a WRITE request. Aspects of the disclosure are operable with any set or configuration of storage layers including storage layers in a virtualized or non-virtualized environment. Exemplary storage layers in a virtualized environment include a storage array layer (e.g., physical disks presented as logical disks), an operating system layer (e.g., a virtual file system layer), and a VM layer (e.g., a virtual disk layer). Exemplary storage layers in a non-virtualized environment include a hard disk layer (e.g., for sector reads and writes), and one or more software layers (e.g., for representing a hard disk as a set of logical disks, for implementing a file system, etc.).

In contrast with signal handlers, the upcall mechanism as described herein is less restrictive. For example, a signal handler must be re-entrant and hence can only call re-entrant safe functions. In contrast, during the time a user space thread is in upcall mode as described herein, the thread may call arbitrary user space functions, system call functions, trigger signal handlers, and more. Additionally, thread local variables may be manipulated by upcalls without any synchronization requirements.

Further, signal handlers are asynchronous. That is, signal handlers may spuriously occur during the execution of a thread, as the execution initiation time of a signal handler cannot be specified exactly. Signals are only serviced on the return path of a system call, or after an interrupt has been serviced by the kernel and a scheduler has decided to schedule the user space thread that was interrupted while executing in user space. In contrast, upcalls as described herein are programmed into thread execution, such as by a function call. As such, an upcall only occurs, from the perspective of a user space application, at an expected point during the execution stream of the thread. For example, an upcall may occur after the initial system call to initialize the upcall mechanism has returned from kernel space (e.g., the first upcall), or the upcall may occur after the user space code enters the kernel again through the system call that transfers control from the upcall function back to the original kernel stack that called the upcall function.

Additionally, signal handlers are recursive, whereas the upcall mechanism is synchronous (e.g., same thread) without recursion.

The infrastructure is implemented in user space as opposed to the kernel, in some embodiments. Aspects of the disclosure may also be implemented entirely in kernel-space.

Further embodiments include a computer-readable storage medium storing instructions that when executed by a computer system cause the computer system to perform the method set forth in this document, and a computer system programmed to carry out that method.

In some embodiments, the threads are associated with one or more virtual machines (VMs) executing on a host computing device as next described with reference to FIG. 1 and FIG. 2. The VM is an abstraction (e.g., virtualization) of an actual physical computer system. The VM, also referred to as the "guest," is installed on a host computer platform which includes system hardware and one or more virtualization layers. Each VM is configured with its own operating system that runs on top of virtual system hardware as emulated by the virtualization layers. A virtual machine kernel (e.g., VMkernel) may be used for arbitrating and/or scheduling processor, network and disk resources efficiently among the VMs and the user processes.

An exemplary virtualized environment is next described. However, those skilled in the art will note, however, that the operations, functionality, and architecture described herein is not limited to a virtualized environment. Rather, aspects of the disclosure are operable with any computing device executing threads that access user space and kernel space.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
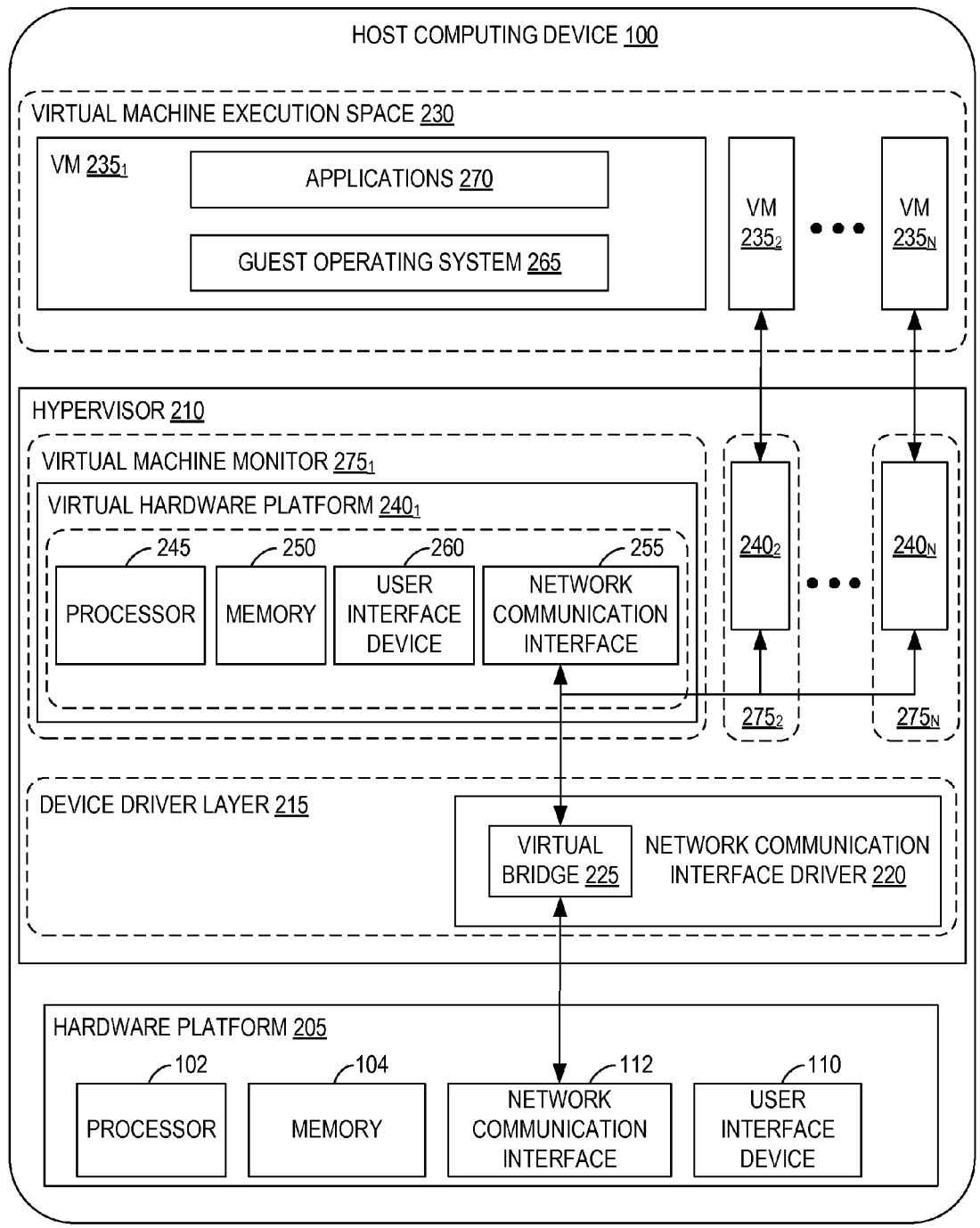
FIG. 2 is a block diagram of virtual machines that are instantiated on a computing device, such as the host computing device shown in FIG. 1.

FIG. 2 depicts a block diagram of virtual machines 235₁, 235₂ . . . 235N that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs 235₁-235N) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs 235₁-235N such that each of VMs 235₁-235N has its own virtual hardware platform (e.g., a corresponding one of virtual hardware platforms 240₁-240N), each virtual hardware platform having its own emulated hardware (such as a processor 245, a memory 250, a network communication interface 255, a user interface device 260 and other emulated I/O devices in VM 235₁). Hypervisor 210 may manage (e.g., monitor, initiate, and/or terminate) execution of VMs 235₁-235N according to policies associated with hypervisor 210, such as a policy specifying that VMs 235₁-235N are to be automatically restarted upon unexpected termination and/or upon initialization of hypervisor 210. In addition, or alternatively, hypervisor 210 may manage execution VMs 235₁-235N based on requests received from a device other than host computing device 100. For example, hypervisor 210 may receive an execution instruction specifying the initiation of execution of first VM 235₁ from a management device via network communication interface 112 and execute the execution instruction to initiate execution of first VM 235₁.

In some embodiments, memory 250 in first virtual hardware platform 240₁ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM 235₁ in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs 235₁-235N). Each virtual communication interface for each VM 235₁-235N, such as network communication interface 255 for first VM 235₁, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs 235₁-235N. This configuration enables an Ethernet packet that has a virtual MAC address as its destination address to properly reach the VM in host computing device 100 with a virtual communication interface that corresponds to such virtual MAC address.

Virtual hardware platform 240₁ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM 235₁. Virtual hardware platforms 240₁-240N may be considered to be part of virtual machine monitors (VMM) 275₁-275N that implement virtual system support to coordinate operations between hypervisor 210 and corresponding VMs 235₁-235N. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms 240₁-240N may also be considered to be separate from VMMs 275₁-275N, and VMMs 275₁-275N may be considered to be separate from hypervisor 210. One example of hypervisor 210 that may be used in an embodiment of the disclosure is included as a component in VMware's ESX brand software, which is commercially available from VMware, Inc.

Figure 3:
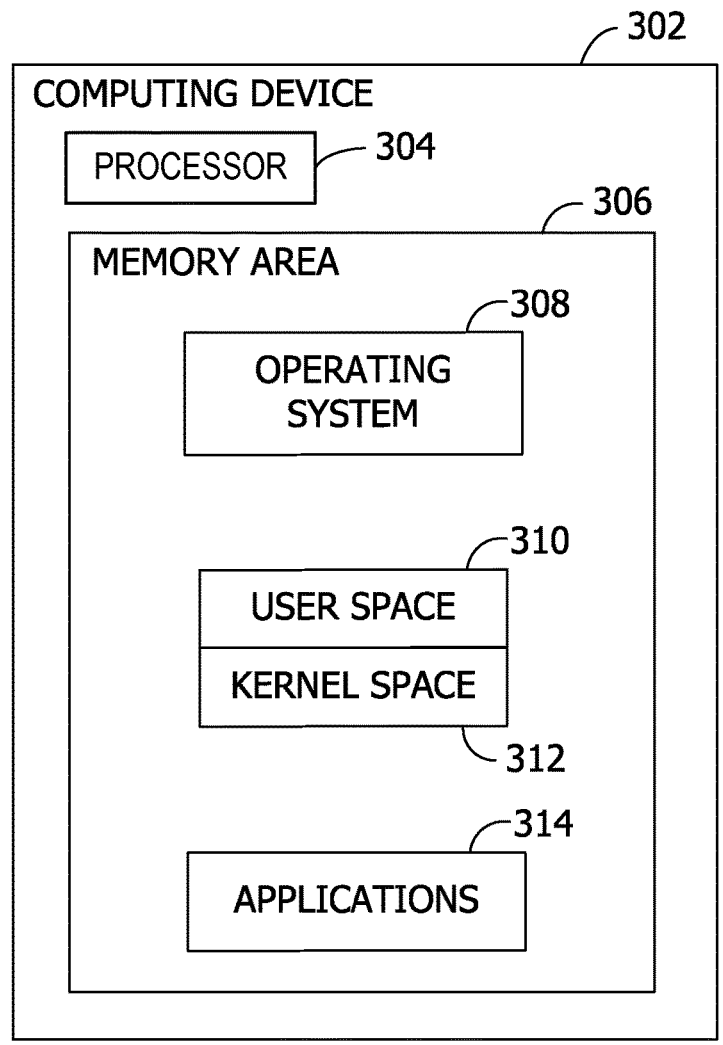
FIG. 3 is a block diagram of an exemplary computing device executing applications that access a user space and a kernel space in a memory area.

FIG. 3 is a block diagram of an exemplary computing device 302 executing applications 314 that access a user space 310 and a kernel space 312 in a memory area 306. Computing device 302 represents any device executing instructions (e.g., as application programs, operating system functionality, or both) to implement operations and functionality. For example, computing device 302 executes instructions to implement the exemplary operations illustrated in FIG. 5A and/or FIG. 5B to perform synchronous execution of a user space operation from a kernel context (e.g., using the same thread). Computing device 302 may include any computing device or processing unit. For example, computing device 302 may represent a group of processing units or other computing devices, such as in a cloud computing configuration.

Computing device 302 has at least one processor 304 and memory area 306. Processor 304 includes any quantity of processing units, and is programmed to execute computer-executable instructions for implementing aspects of the disclosure. The instructions may be performed by processor 304 or by multiple processors executing within computing device 302, or performed by a processor external to, yet in communication with, computing device 302. In some embodiments, processor 304 is programmed to execute instructions such as those illustrated in the figures to implement upcall functionality as described herein.

Memory area 306 includes any quantity of computer-readable media associated with or accessible by computing device 302. Memory area 306, or portions thereof, may be internal to computing device 302, external to computing device 302, or both. In the example of FIG. 3, memory area 306 stores an operating system 308 and one or more applications 314. Operating system 308 represents any computer-executable instructions that manage execution of applications 314. For example, operating system 308 provides core services to applications 314 such as scheduling, memory management, process management, networking, storage, and the like. The core services are encapsulated in a software bundle, referred to as a kernel, that typically executes in protected address space. Applications 314 do not have direct access to any of the data structures and algorithms implemented in the kernel. Such protection may be implemented in hardware. For example, for INTEL brand x86 architectures, user space 310 runs in ring three, the kernel runs in ring zero, and the hardware boundary protects the kernel from user space 310. This provides reliability and protection from crashes.

Applications 314, when executed by processor 304, operate to perform functionality on computing device 302. Exemplary applications 314 include mail application programs, web browsers, calendar application programs, address book application programs, messaging programs, media applications, location-based services, search programs, networking applications, and the like. Applications 314 may communicate with counterpart applications or services such as web services accessible via a network. For example, applications 314 may represent downloaded client-side applications that correspond to server-side services executing in a cloud.

Memory area 306 also has user space 310 and kernel space 312. User space 310 represents an area for executing code in user mode or context (e.g., content protection layer three). Kernel space 312 represents an area for executing code inside the kernel.

One of applications 314, when executed as one or more processes, may spawn one or more threads 402 that execute in user space 310 and/or kernel space 312. Each thread 402 represents one or more computer-executable instructions, such as in a sequence. For example, thread 402 may run in kernel space 312 or other protected environment, such as those with current privilege level (CPL) zero. The same thread 402 may also execute in user space 310. For example, thread 402 may mostly run in user space 310, but then cross the user space 310/kernel space 312 boundary to execute in the context of the kernel.

Figure 4:
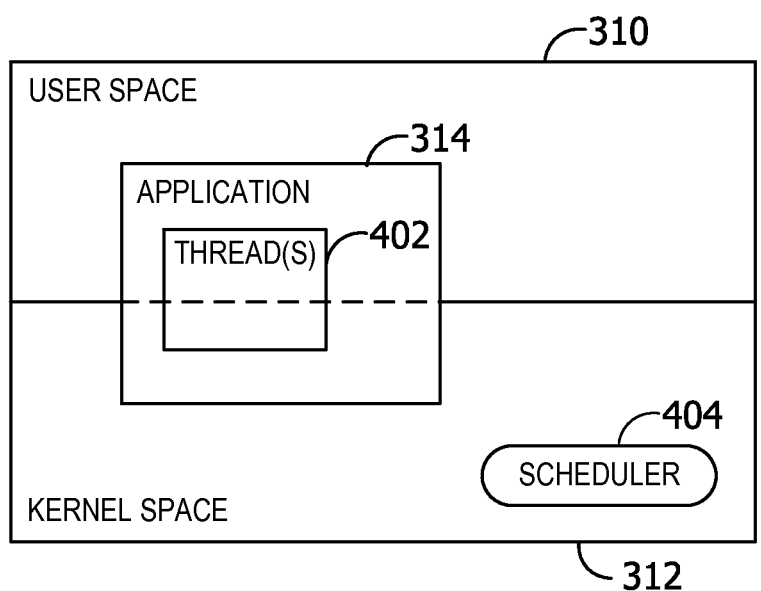
FIG. 4 is a block diagram of an application having one or more threads that span user space and kernel space.

FIG. 4 is a block diagram of one of applications 314 having one or more threads 402 that span user space 310 and kernel space 312. That is, threads 402 may execute in user space 310 and/or kernel space 312. In the example of FIG. 4, a scheduler 404 manages execution of threads 402. For example, scheduler 404 switches execution of one of threads 402 from kernel space 312 into user space 310 by switching operating system 308 from one CPL to another CPL. The same thread 402 may execute in user space 310 and kernel space 312, such as by executing in user space 310 and then calling a kernel function that is executed in kernel space 312.

Figure 5A:
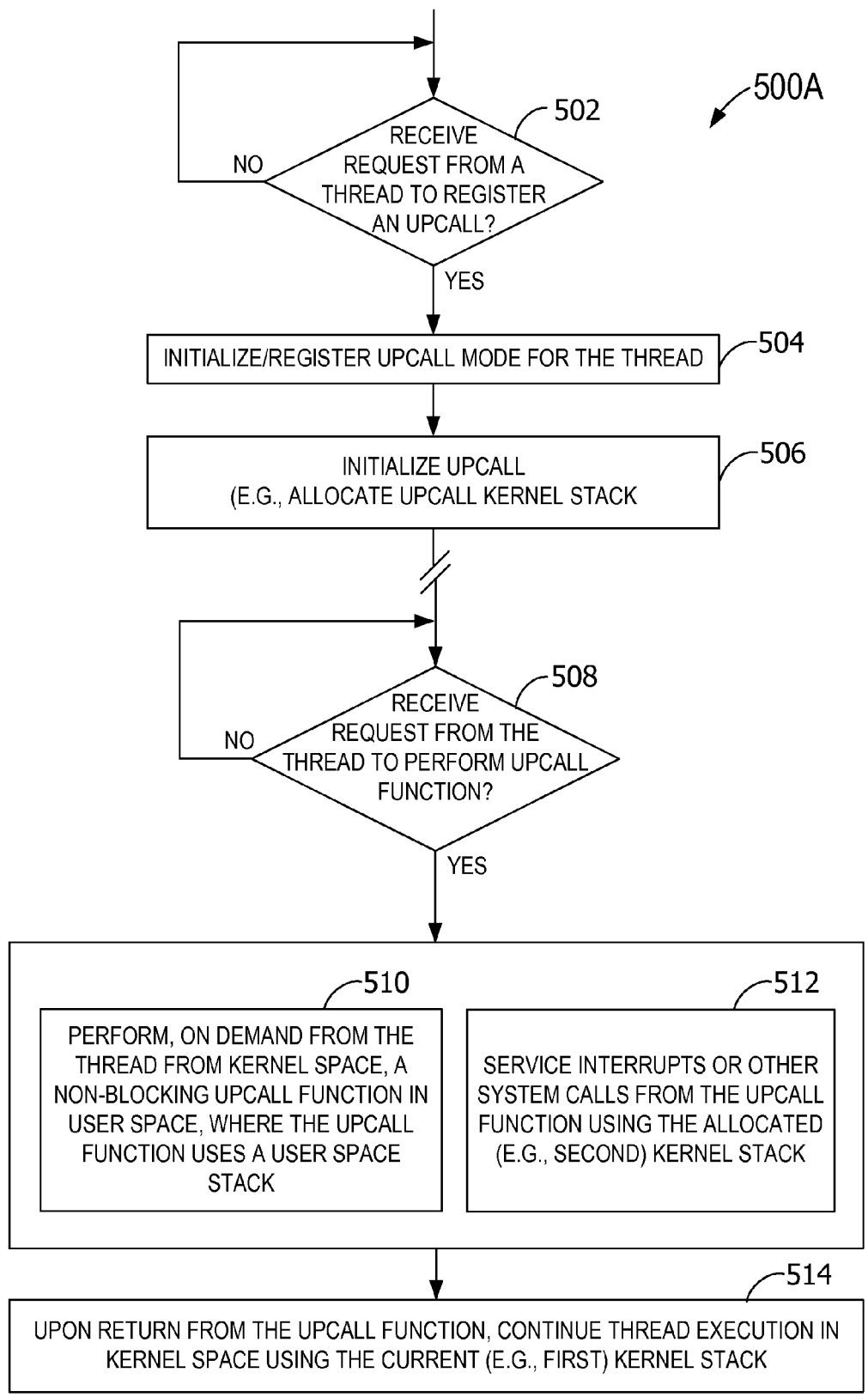
FIG. 5A is a flowchart of an exemplary method performed by the computing device to perform upcall functions, in user space, on demand from a thread executing in kernel space.

FIG. 5A is a flowchart of an exemplary method 500A performed by computing device 302 to perform upcall functions, in user space 310, on demand programmatically (e.g., as programmed in application 314) from thread 402 executing in kernel space 312. While method 500A is described with reference to execution by computing device 302 (shown in FIG. 3), it is contemplated that method 500A may be performed by any computing device. In some embodiments, the operations illustrated in FIG. 5A are performed from the perspective of operating system 308, thread 402, and the like. Further, while described with reference to a single thread 402, a plurality of threads 402 may execute to perform the operations illustrated in FIG. 5A.

At 502, operating system 308 checks whether a request has been received from thread 402 to register an upcall in kernel space 312. In this example, thread 402 is executing in user space 310. Upon receiving a request from thread 402 to register an upcall, operating system registers, configures, initializes, or otherwise prepares computing device 302 to perform one or more upcalls at 504. For example, at 506, operating system 308 initializes the upcall by, for example, allocating an upcall kernel stack (e.g., a second kernel stack) separate from a current kernel stack (e.g., a first kernel stack). Aspects of the disclosure contemplate any size for the allocated stack. Further, from the perspective of operating system 308, each of a plurality of executing threads 402 has one upcall stack.

As another example, operating system 308 associates thread 402 with the initialized upcall mode to prevent other threads 402 from attempting to access the initialized upcall mode.

Operating system 308 then checks for requests from thread 402 to perform an upcall function at 508. Upon receiving a request to perform one or more upcall functions from thread 402 executing in kernel space 312 (e.g. the same thread 402 that initialized the upcall mode), operating system 308 performs the requested upcall function in user space 310 at 510. The request is received via the initialized upcall mode. In this manner, operating system 308 executes the upcall function in user space 310 on demand (e.g., as programmed in thread 402) from the thread 402 executing in kernel space 312. Execution of the upcall function proceeds in user space 310 with a user space stack. In some embodiments, operating system 308 executes the function in user space 310 in an unrestricted execution context. For example, at 512, operating system 308 services, in kernel space 312, interrupts or other regular system kernel calls (e.g., kernel space functions) from the upcall function using the allocated kernel stack.

As an example, the switch to the upcall function is non-blocking; however, the upcall function itself can block. That is, the upcall function can perform one or more system calls that might block inside the kernel, and get unblocked once a condition is met that unblocks the thread.

Upon return from the upcall function at 514 (e.g., termination of the upcall function), operating system 308 continues thread 402 execution in kernel space 312 using the same kernel stack from which the upcall function originated (e.g., the first kernel stack). For example, operating system 308 switches back to the first kernel stack and continues execution from there on, as if the upcall function was just another kernel function from the perspective or point of view of the first kernel stack.

After thread 402 has no further upcall functions to execute, thread 402 closes the upcall mode. For example, operating system 308 de-allocates (e.g., deletes) the additional kernel stack (e.g., the second kernel stack).

Aspects of the disclosure support upcall modes initialized by a plurality of threads 402. For example, operating system 308 may initialize a first upcall mode from a first thread and a second upcall mode from a second thread. Operating system 308 restricts access such that the first thread can only access the first upcall mode, and the second thread can only access the second upcall mode. Further, in some embodiments, operating system 308 is limited to performance of one upcall function at a time. Other restrictions on execution of the upcall function are contemplated. For example, operating system 308 may prevent the upcall function from executing recursively.

Figure 5B:
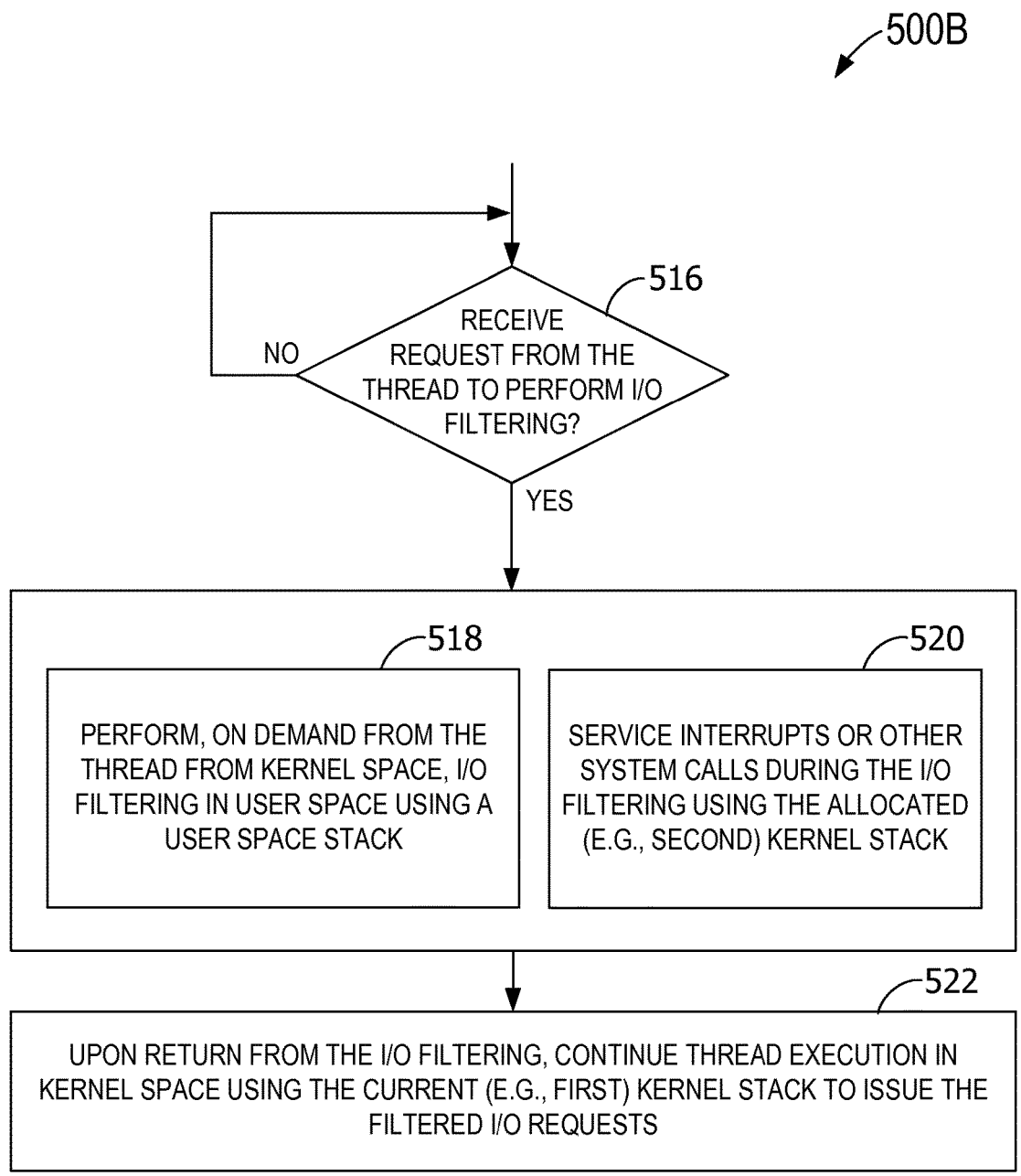
FIG. 5B is a flowchart of an exemplary method performed by the computing device to perform input/output (I/O) filtering as an upcall function, in user space, on demand from a thread executing in kernel space.

FIG. 5B is a flowchart of an exemplary method 500B performed by the computing device to perform input/output (I/O) filtering as an upcall function, in user space, on demand from a thread executing in kernel space. While method 500B is described with reference to execution by computing device 302 (shown in FIG. 3), it is contemplated that method 500B may be performed by any computing device. In some embodiments, the operations illustrated in FIG. 5B are performed from the perspective of operating system 308, thread 402, and the like. Further, while described with reference to a single thread 402, a plurality of threads 402 may execute to perform the operations illustrated in FIG. 5B.

In method 500B, operating system 308 has already registered, configured, initialized, or otherwise prepared computing device 302 to perform one or more upcalls. For example, operating system 308 has initialized the upcall by allocating an upcall kernel stack (e.g., a second kernel stack) separate from a current kernel stack (e.g., a first kernel stack).

Operating system 308 checks for requests from thread 402 to perform I/O filtering at 516. Upon receiving a request from thread 402 executing in kernel space 312 (e.g., the same thread 402 that initialized the upcall mode) to filter I/O commands, operating system 308 performs I/O filtering in user space 310 at 518. For example, the I/O command represents a request to read or write data as well as the response thereto (e.g., a request to read data from particular sectors as well as the data read therefrom).

The request from the thread 402 is received via the initialized upcall mode. In this manner, operating system 308 executes the I/O filtering as an upcall function in user space 310 on demand (e.g., as programmed in thread 402) from the thread 402 executing in kernel space 312. Execution of the I/O filtering proceeds in user space 310 with a user space stack. In some embodiments, operating system 308 performs I/O filtering in user space 310 in an unrestricted execution context. For example, at 520, operating system 308 services, in kernel space 312, interrupts or other regular system kernel calls (e.g., kernel space functions) occurring during the I/O filtering using the allocated kernel stack. For example, filtering the I/O commands identifies one or more of the I/O commands.

Upon completion of the filtering in user space 310 (e.g., upon return or termination of the upcall function), operating system 308 continues thread 402 execution in kernel space 312 using the same kernel stack from which the upcall function originated (e.g., the first kernel stack). For example, operating system 308 switches back to the first kernel stack and continues execution from there on, as if the upcall function was just another kernel function from the perspective or point of view of the first kernel stack.

In the example of FIG. 5B, operating system 308 continues thread 402 execution by issuing the filtered I/O requests further down through storage layers (e.g., down a storage stack) in kernel space 312 at 522 (e.g., executes the identified I/O commands in kernel space 312) and filtered I/O completions are completed further up through the storage layers (e.g., up the storage stack) in kernel space. Aspects of the disclosure are capable of integrating at any of the storage layers. Exemplary I/O commands includes a storage command (e.g., READ or WRITE), a memory command, a network command, and/or any other I/O command. As described herein, the storage stack refers to hardware and/or software layers implementing storage in virtualized and/or non-virtualized environments.

In some embodiments, one or more computer-readable storage media include computer-executable instructions such as those illustrated in FIG. 5A and/or FIG. 5B that, when executed, cause processor 304 to perform synchronous execution of a user space operation from a kernel context.

Figure 6A:
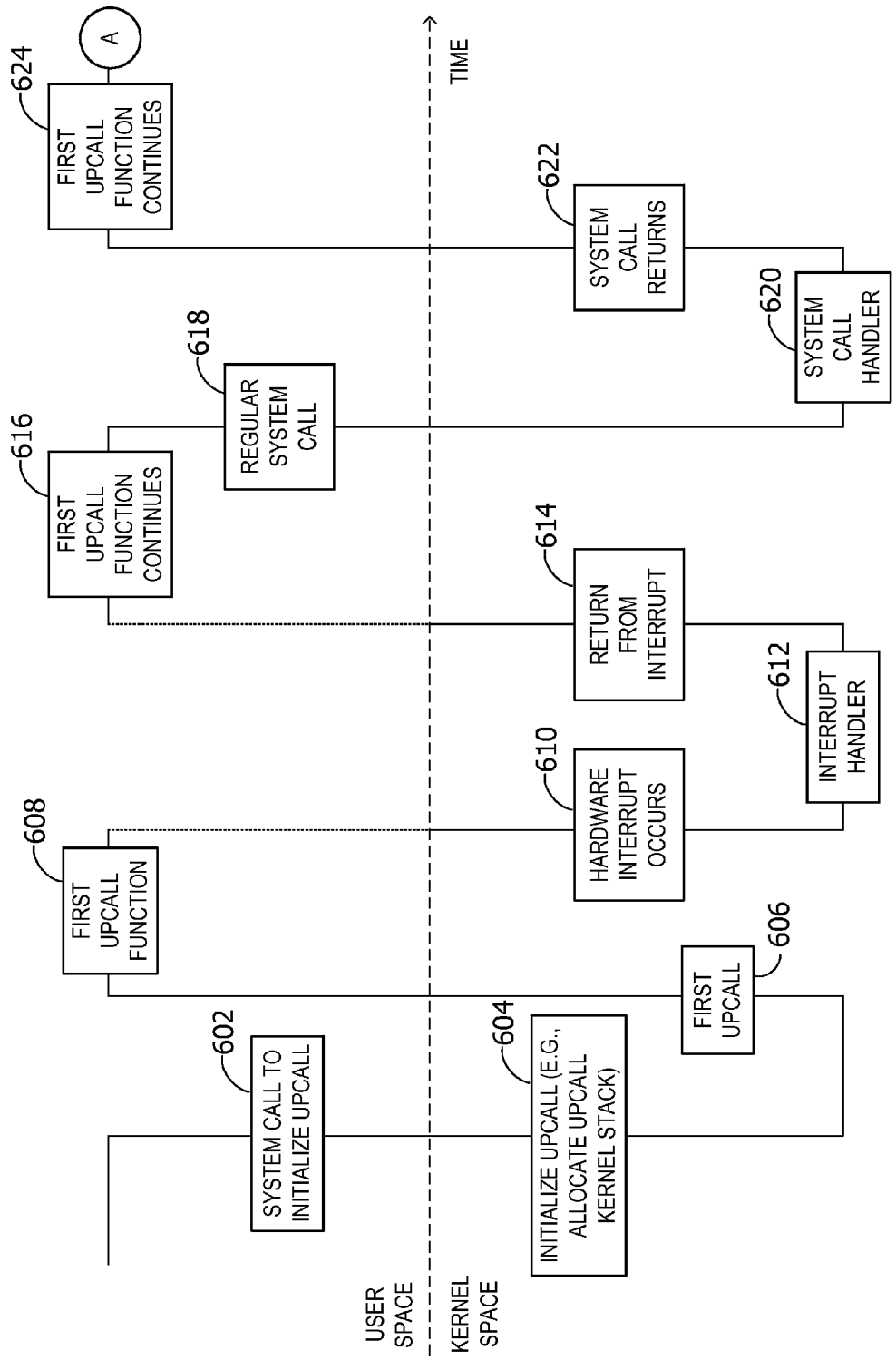
FIGS. 6A and 6B are block diagrams illustrating exemplary initialization of upcall mode, performance of upcall functions, and return from the upcall mode.
Figure 6B:
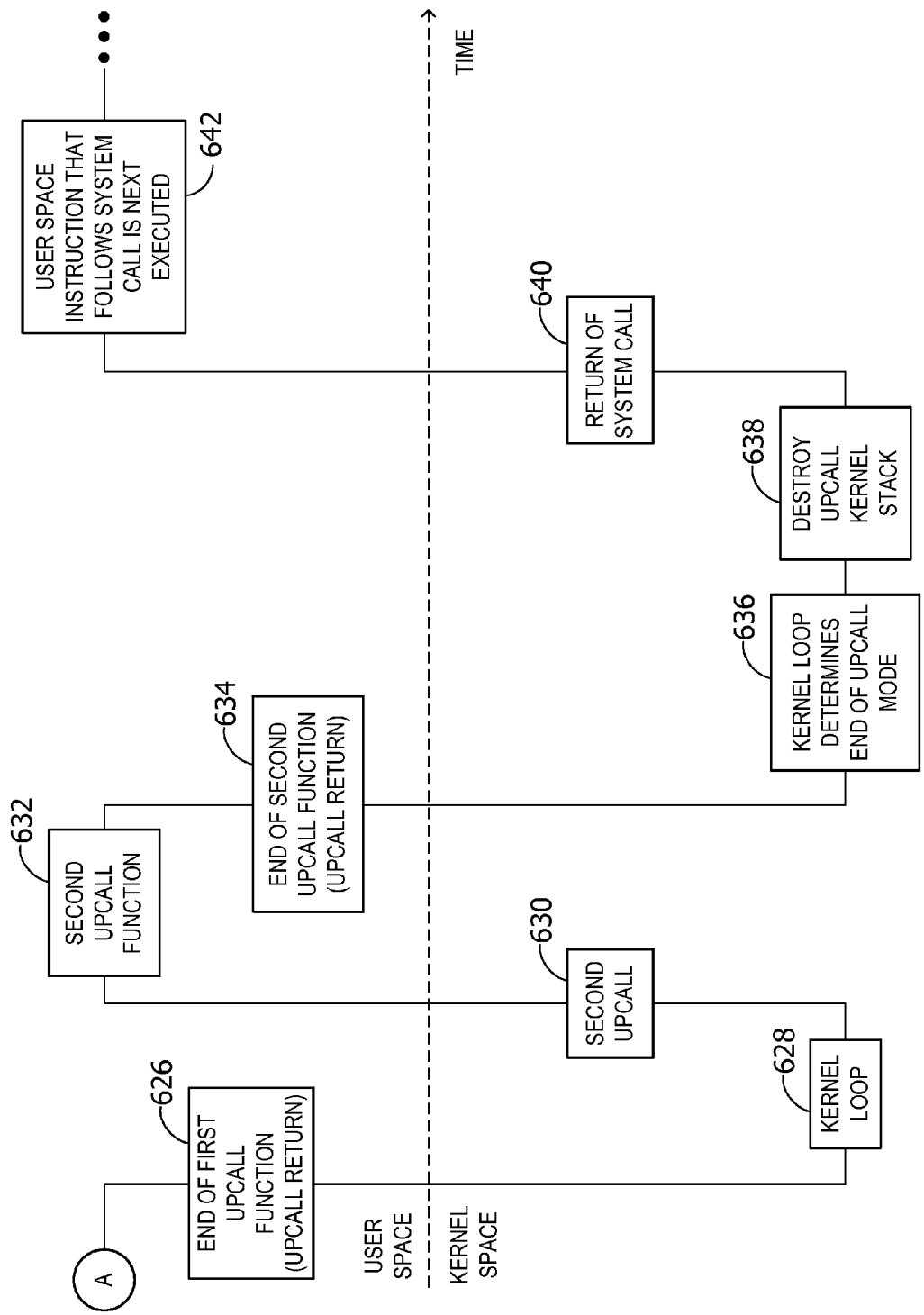

FIG. 6A and FIG. 6B are block diagrams illustrating exemplary initialization of upcall mode, performance of upcall functions, and return from the upcall mode. The example in FIG. 6A and FIG. 6B illustrates an example process flow for a thread.

In FIG. 6A, a system call to initialize upcall mode is made from user space 310 at 602. In kernel space 312, operation system 308 initializes upcall mode at 604 (e.g., the upcall kernel stack is allocated). A first upcall is made from kernel space 312 at 606. A first upcall function is performed in user space 310 at 608. During execution of the first upcall function, a hardware interrupt occurs at 610 which is processed by an interrupt handler in kernel space 312 at 612. Processing returns from the interrupt at 614, and the first upcall function continues execution in user space 310 at 616. During further execution of the first upcall function in user space 310, a regular system call occurs at 618. The regular system call is processed by a system call handler in kernel space 312 at 620. The system call returns to user space 310 at 622 and the first upcall function continues execution at 624.

In FIG. 6B, the first upcall function ends (e.g., upcall return) at 626. A kernel loop executes in kernel space 312 at 628, which issues a second upcall at 630. A second upcall function is then executed in user space 310 at 632. The second upcall function ends (e.g., upcall return) at 634, and the kernel loop again executes. The kernel loop determines that there will be no further upcalls (e.g., end of upcall mode) at 636, and the upcall kernel stack is destroyed at 638. The system call returns to user space 310 at 640, and the user space instruction following the system call is then executed at 642 as the thread continues execution.

Aspects of the disclosure minimize the registers to which read and write commands are made during an upcall in a 64-bit architecture (e.g., Intel x86). For example, when application 314 initializes the upcall mode, a regular system call layer preserves the entire register state but the floating point unit (FPU) state does not get saved during this operation. As such, by encapsulating a system call instruction in a function call, aspects of the disclosure rely on an application binary interface (ABI) to make sure that the caller of the encapsulated system call preserves the state of its FPU registers.

In some embodiments, during the initialization of the upcall mode (or during other related system calls), thread 402 specifies the upcall function that should be called during an upcall and identifies what parameters are in the upcall function. An example upcall function may be defined as void UpcallFunc(void *data) where the data argument is then casted to an internal data structure that specifies the actual input parameters for the upcall function.

Even though the upcall initialization is not re-entrant, aspects of the disclosure may provide the kernel with multiple functions and their corresponding arguments that the kernel can execute at the appropriate time.

Figure 7:
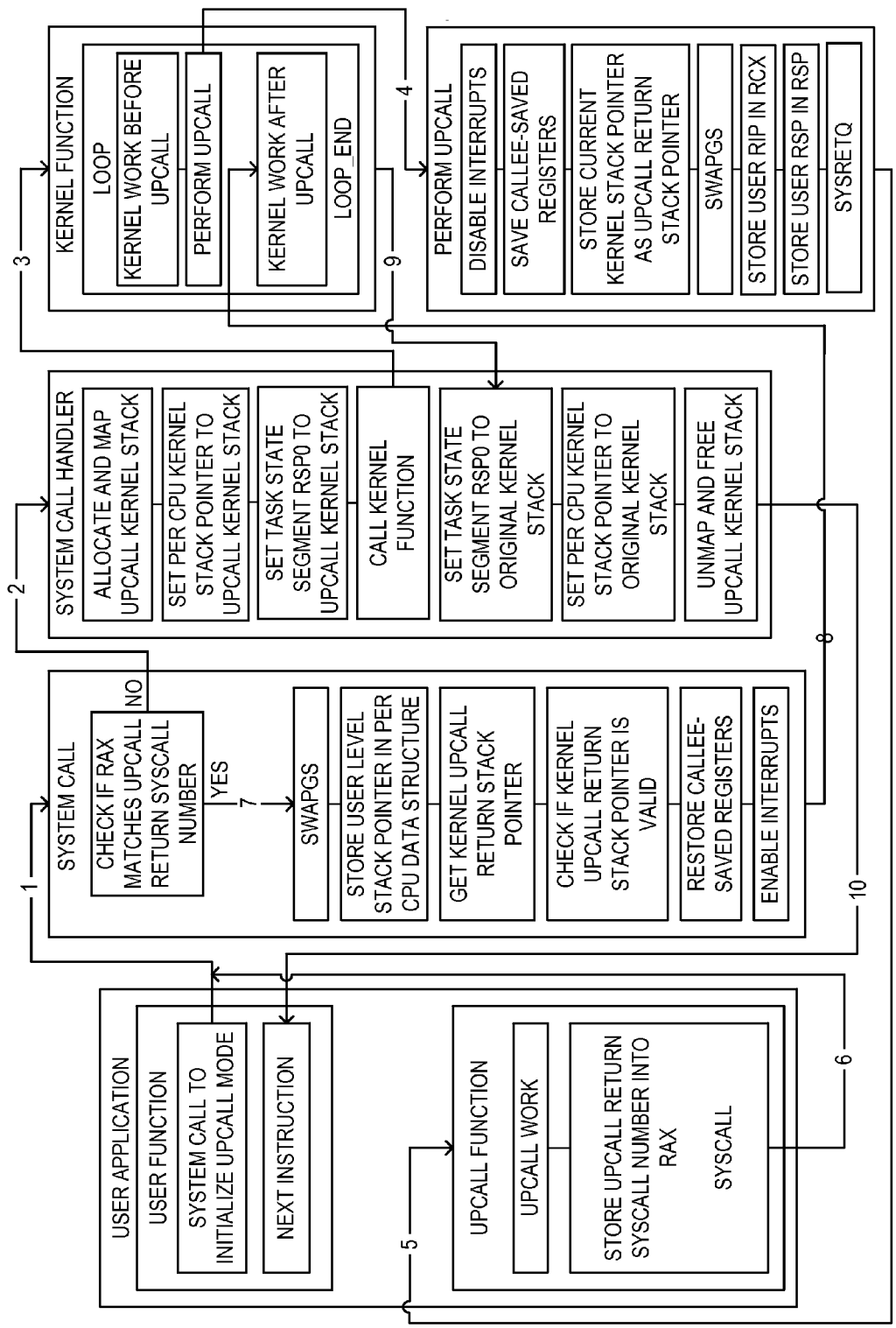
FIG. 7 is a block diagram illustrating an exemplary control flow among components of the computing device to implement upcall functionality in a 64-bit architecture (e.g., Intel x86).

FIG. 7 is a block diagram illustrating an exemplary control flow among components of computing device 302 to implement upcall functionality in a 64-bit architecture (e.g., Intel x86). While the control flow in FIG. 7 applies to x86 64-bit operation, other applications are contemplated. In a virtualized example, the upcall mechanism performs performance-critical I/O commands inside a 64-bit process (e.g., a virtual machine management process), while non-performance critical virtual disk operations are performed inside 32-bit applications.

FIG. 7 illustrates an exemplary ten exchanges (e.g., indicated by the numbered arrows) among an exemplary five components associated with operating system 308. The exemplary components include User Application, Syscall, System Call Handler, Kernel Function, and Perform Upcall, although additional or fewer components are contemplated. Further, additional or fewer exchanges are contemplated. Within each component, a number of operations may be executed (e.g., based on prior processing). FIG. 7 also illustrates an exemplary Upcall Function.

In Exchange 1, a user space application calls a System Call (e.g., syscall) that functions to switch the user level thread into an upcall thread, and to execute a specific kernel logic. Exchange 1 specifies the System Call Handler by setting the system call handler ID into a register, such as the rax register in x86 architectures. In 64-bit systems, the syscall instruction provides a fast privilege level switch. In 32-bit systems, vendor-specific solutions may be implemented. For example, AMD supports the syscall instruction for 32-bit applications but does not support the sysexit instruction for 64-bit kernels. Intel supports the syscall instruction for 64-bit application, and only the syscall instruction for 32-bit applications with a 64-bit kernel. Alternatively, the int instruction may be used to enter the kernel. Using the int instruction is slower as it is not optimized for a fast kernel to user space transition, but use of the int instructions is applicable across vendors.

In Exchange 2, because this is a regular system call, the System Call logic calls the System Call Handler corresponding to the system call handler ID specified in the rax register.

In Exchange 3, the System Call Handler sets up the upcall mechanism and calls the Kernel Function. Exemplary processing in Exchange 3 includes allocating and mapping a secondary kernel stack for use while executing in user space 310 (e.g., to service interrupts or other system calls), and specifying in the kernel that the secondary kernel stack is to be used when the switch is made from user space 310 to kernel space 312 through a system call, exception or interrupt. Exchange 3 further includes calling the Kernel Function that is to later perform the upcall into user space 310. This Kernel Function may be a function that performs an operation in a loop. In embodiments that implement an I/O filter framework, the Kernel Function corresponds to a function that drains an adapter ring.

In Exchange 4, after the Kernel Function reaches the point for transferring the control synchronously to user space 310 to execute a pre-defined function, the Kernel Function calls the Perform Upcall component to handle the transition into user space 310. The Perform Upcall function stores the current kernel stack pointer that is used upon return from the upcall. In some embodiments, for security purposes, all registers that are not used for the control transfer from kernel space 312 to user space 310 may be set to zero before the function switches from kernel space 312 execution into user space 310 execution and starts executing the pre-defined function in user space 310.

After Exchange 5, the Upcall Function may perform further system calls while the Upcall Function is executing in its upcall work code section. All new system calls are serviced by the secondary kernel stack.

In Exchange 6, after the Upcall Function has finished performing its work in user space 310, the Upcall Function switches back to kernel space 312 by setting the upcall syscall return number into rax and calling System Call.

Exchange 7, which is internal to the System Call represents the upcall return system call that was identified via the syscall return number as the system call handler ID. The kernel stack pointer that was stored earlier (e.g., in Exchange 4) is acquired.

In Exchange 8, the System Call code jumps back to the Kernel Function on the original kernel stack and resumes execution there. From the Kernel Function perspective, it appears that the Perform Upcall function has returned like any other kernel function. At this point, the upcall stack is still active (e.g., to perform additional upcalls).

In Exchange 9, if the Kernel Function determines that it is not necessary to perform any further upcalls or to perform the kernel work anymore, the Kernel Function returns to the System Call Handler that originally called the kernel.

In Exchange 10, the System Call Handler specifies that the original kernel stack should be used again when the switch is made from user space 310 to kernel space 312 through a system call, exception or interrupt. The System Call Handler unmaps and frees the secondary stack, and returns to user space 310 to the next instruction in the User Application (e.g., the instruction that follows the system call that initiated the upcall mechanism, in this example).

Figure 8:
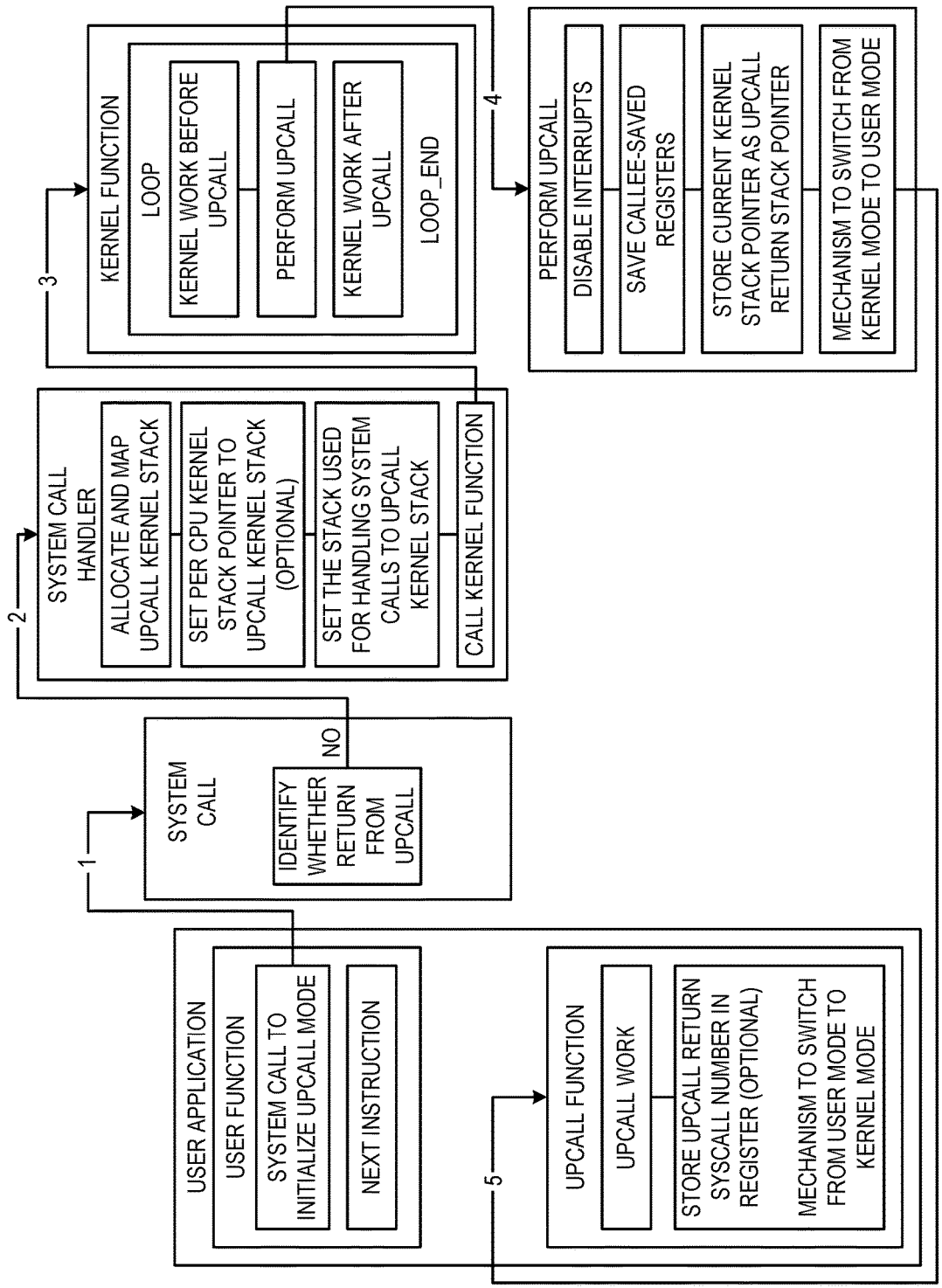
FIG. 8 is a block diagram illustrating an exemplary control flow among components of the computing device to initialize and perform an initial upcall function.

FIG. 8 is a block diagram illustrating an exemplary control flow among components of computing device 302 to initialize and perform an initial upcall function. The flow illustrated in FIGS. 8, 9, 10, and 11 are applicable to both 64-bit and 32-bit systems. In Exchange 1, a user space application calls the System Call component. The System Call component identifies whether the control flow is returning from an upcall.

In Exchange 2, in the instance where the control flow is not returning from an upcall, the System Call logic calls the System Call Handler. After completing the System Call Handler functions illustrated in FIG. 8, Exchange 3 calls the Kernel Function. The Kernel Function requests performance of an upcall via Exchange 4 to the Perform Upcall component. After switching from kernel mode to user mode, the Perform Upcall component call the Upcall Function via Exchange 5.

Figure 9:
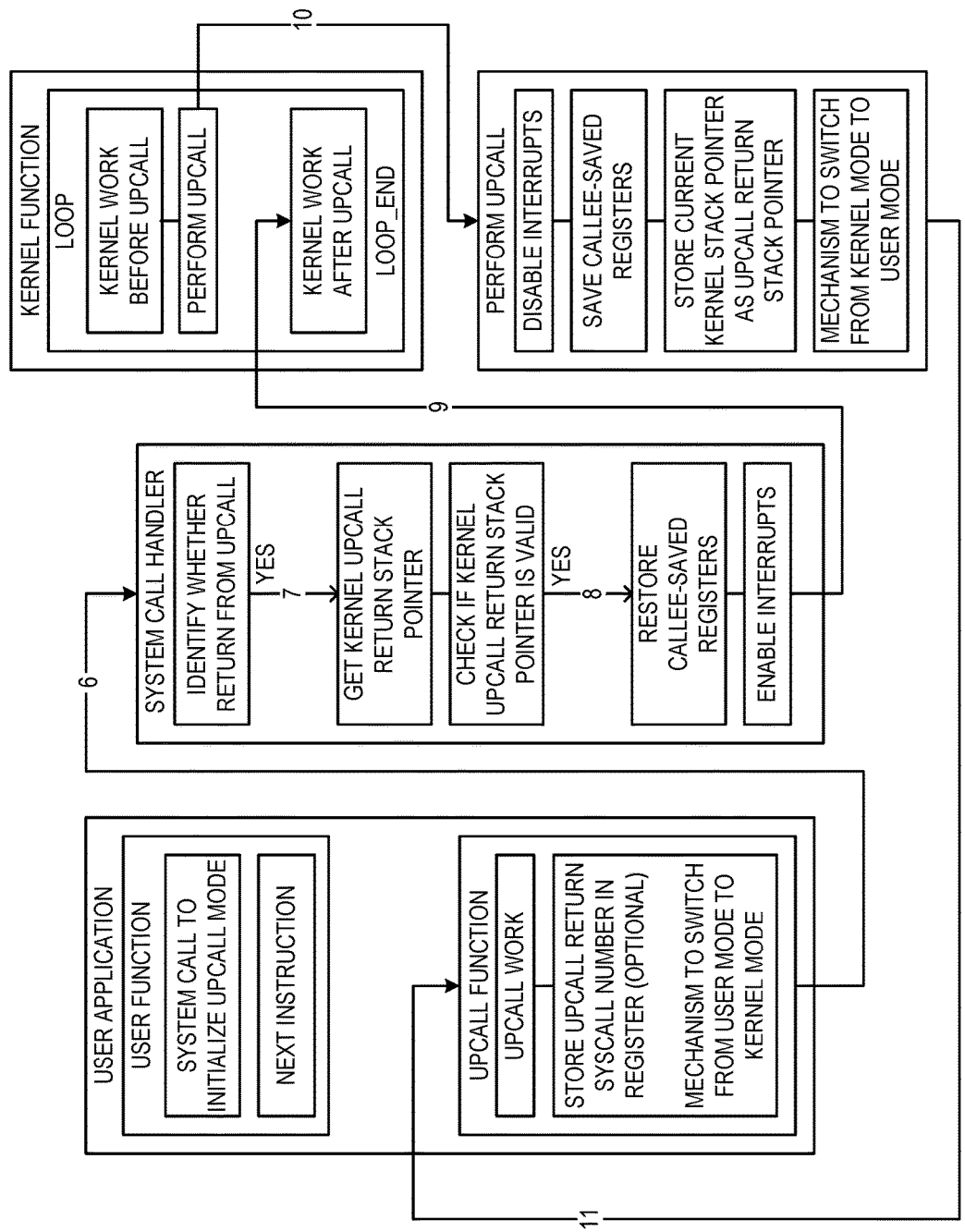
FIG. 9 is a block diagram illustrating an exemplary control flow among components of the computing device to perform subsequent upcall functions.

FIG. 9 is a block diagram illustrating an exemplary control flow among components of computing device 302 to perform subsequent upcall functions. In the example of FIG. 9, after performing one upcall in user space 310, the control flow returns to kernel space 312 to execute the kernel loop again and issue a new upcall into user space 310.

In Exchange 6, after switching from user mode to kernel mode, the Upcall Function calls the System Call Handler via Exchange 6. Upon concluding that the control flow has returned from an upcall, the System Call Handler at internal Exchange 7 obtains the kernel upcall return stack pointer and determines whether the pointer is valid. If the pointer is valid, the System Call Handler restores callee-saved registers and enables interrupts after internal Exchange 8.

In Exchange 9, the System Call Handler calls the Kernel Function to perform kernel work after the upcall. The Kernel Function loops to perform another upcall and, via Exchange 10, calls the Perform Upcall component. After completing the operations illustrated in FIG. 8, the Perform Upcall component calls the Upcall Function.

Figure 10:
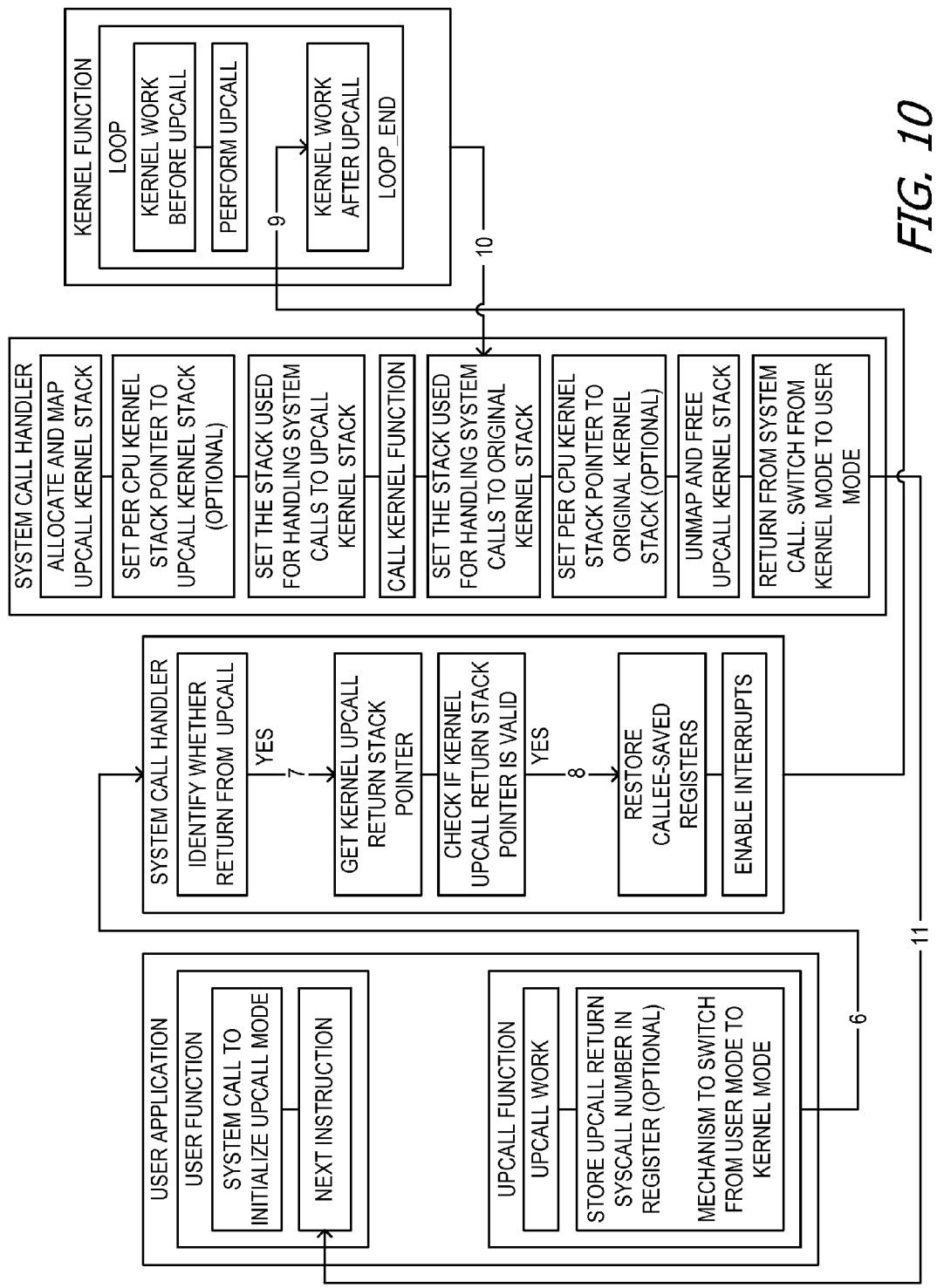
FIG. 10 is a block diagram illustrating an exemplary control flow among components of the computing device to close the upcall mode.

FIG. 10 is a block diagram illustrating an exemplary control flow among components of computing device 302 to close the upcall mode, when there are no further upcall functions to call. For example, FIG. 10 illustrates the control flow when the control flow of FIG. 9 is not applicable (e.g., no further upcall functions). After returning from the upcall into kernel space 312, the register state of the user space application is irrelevant for the further execution of the application because the function ended at that point. As such, operating system 308 does not preserve the register state of the application. Subsequently, the kernel either jumps back to the beginning of the upcall function, or completes the initial system call that initialized the upcall mechanism and restores the original register state that was stored on the original kernel stack.

In Exchange 6, after switching from user mode to kernel mode, the Upcall Function calls the System Call Handler via Exchange 6. Upon concluding that the control flow has returned from an upcall, the System Call Handler at internal Exchange 7 obtains the kernel upcall return stack pointer and determines whether the pointer is valid. If the pointer is valid, the System Call Handler restores callee-saved registers and enables interrupts after internal Exchange 8.

In Exchange 9, the System Call Handler calls the Kernel Function to perform kernel work after the upcall. The loop in the Kernel Function ends (e.g., no further upcalls to perform), and the control flow returns to the System Call Handler via Exchange 10.

The System Call Handler performs the operations illustrated in FIG. 10 and, after switching from kernel mode to user mode, proceeds to the next instruction in the User Application via Exchange 11.

Figure 11:
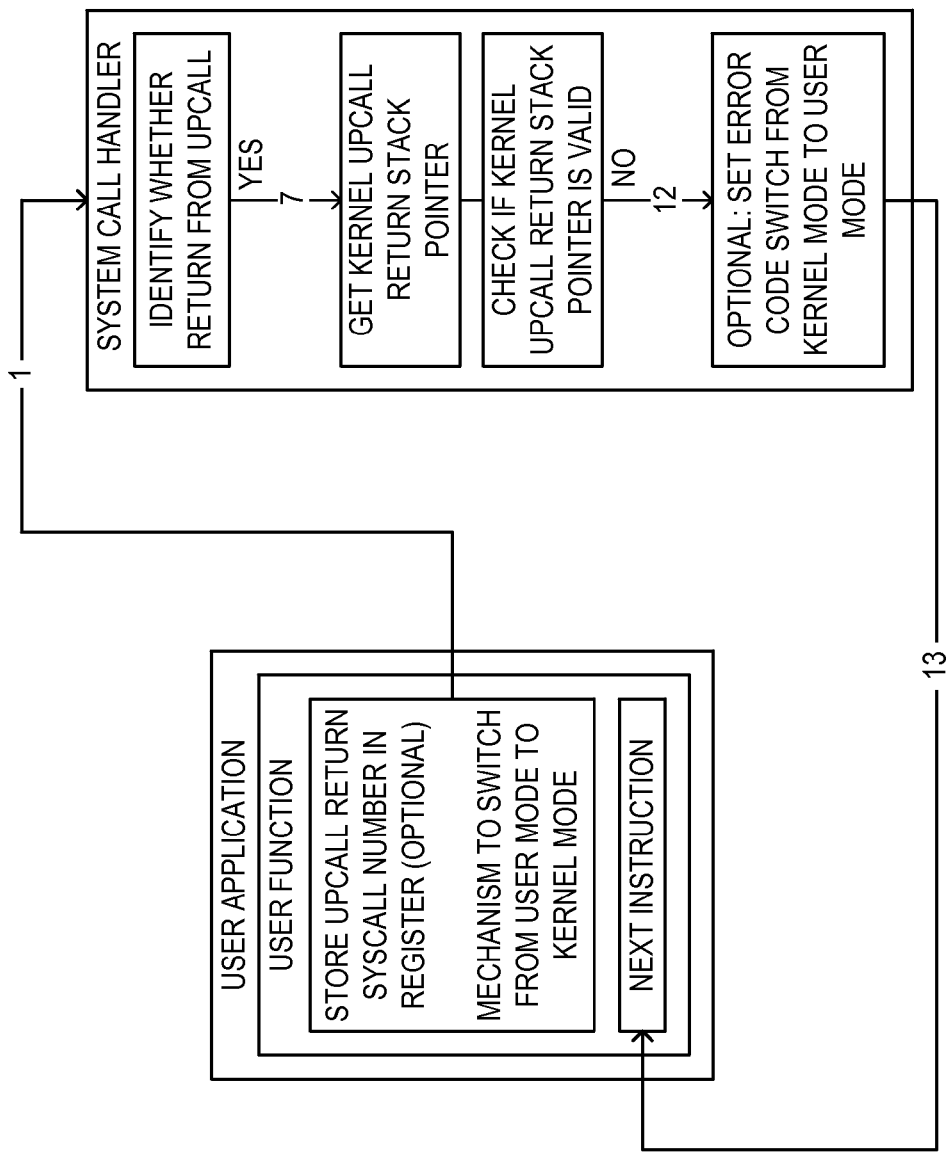
FIG. 11 is a block diagram illustrating an exemplary control flow among components of the computing device when a user space application attempts to complete an upcall without being registered for that upcall.

FIG. 11 is a block diagram illustrating an exemplary control flow among components of computing device 302 when a user space application attempts to complete an upcall without being registered for that upcall. In the example of FIG. 11, the User Application calls the System Call Handler via Exchange 1. Upon concluding that the control flow has returned from an upcall, the System Call Handler at internal Exchange 7 obtains the kernel upcall return stack pointer and determines whether the pointer is valid. For example, the kernel code verifies that the user space application (as opposed to other user space applications) has successfully initialized the upcall mechanism before allowing the user space application to make the system call to perform an upcall. If the pointer is invalid at internal Exchange 12, the System Call Handler sets an error code and returns the control flow to the next instruction in the User Application via Exchange 13. For example, if an application other than the one that initialized the upcall attempts to perform the upcall, operating system 308 detects the attempt (e.g., by checking whether a valid upcall return stack pointer has been stored), sets an error code, and jumps back to user space 310. Further, if any application attempts to initialize an upcall mode while operating system 308 is already in upcall mode, operating system 308 returns an error.

ADDITIONAL EXAMPLES

The following scenarios are merely exemplary and not intended to be limiting in any way.

Some virtualized environments use a single user space thread that performs all the processing for all virtual disks associated with a single virtual adapter. The different virtual disks are identified by an argument provided to the upcall function. During initialization of the virtual disk, the data structure is initialized and a pointer is passed down to the kernel for association with the virtual disk. Whenever operating system 308 performs an operation on behalf of the virtual disk in an upcall, the pointer is provided to the upcall function. Similarly, the system call to initialize the upcall could take two function pointers: one for the I/O request path and one for the I/O completion path that gets called whenever the kernel wants to handle either I/O requests or completions.

In some embodiments, kernel context is allowed to hold system resources across a blockable function call inside the kernel (e.g., place a lock or semaphore on the system resources to prevent use of the system resources by another thread). Aspects of the disclosure allow the kernel thread to hold these system resources (e.g., without the kernel to keep track of the resources). If the upcall thread dies in user space or tries to exit the thread without explicitly returning from the upcall or otherwise exits or terminates prematurely, the kernel performs operations during the beginning of the thread cleanup process to manage the system resources. Exemplary operations include checking whether an upcall stack is specified. If an upcall stack is not specified, then regular thread cleanup is performed. If an upcall stack is specified, the operations includes checking whether the upcall return stack pointer is specified. If the upcall return stack pointer is specified, the operations include switching from the kernel upcall stack to the original kernel stack that performed the upcall. An error is returned by the upcall function (e.g., by returning an error code, setting a flag, and/or the like) to indicate to the caller of the upcall function that thread cleanup needs to be performed and that the caller of the upcall function should not return back to user space. The kernel thread that called the upcall function sees the error code (or the flag), releases the system resources, and triggers the remaining cleanup of the thread.

Exemplary Operating Environment

In general, at least some of the structures and functionality presented as separate components in exemplary configurations may be implemented as a combined structure or component. Similarly, some of the structures and functionality presented as a single component may be implemented as separate components. These and other variations, modifications, additions, and improvements may fall within the scope of the appended claims(s).

The operations described herein may be performed by a computer or computing device, such as computing device 302. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

One or more embodiments of the present disclosure may be implemented as one or more computer programs, modules, or the like, embodied in one or more computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), network attached storage (NAS), compact discs (CDs), floppy disks, tape cassettes, and other solid-state memory. The computer storage media may also be distributed over a network coupled computer system so that computer readable code is stored and executed in a distributed fashion. In contrast, communication media typically embody computer readable instructions, data structures, program modules, or other data in a modulated data signal such as a carrier wave or other transport mechanism, and include any information delivery media.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer thereby creating a special purpose computing device.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for synchronous execution of a user space operation without a thread switch from a kernel context, the system comprising:
a memory area storing an operating system having a kernel space and a user space; and
a processor programmed to:
initialize, from a thread executing in the user space, an upcall mode into the kernel space;
perform, by the same thread from the kernel space via the initialized upcall mode, a function in the user space, wherein performing the function comprises filtering one or more input/output (I/O) requests from the thread in the user space; and
upon completion of the function in the user space, return to the kernel space to perform another function from the same thread, wherein performing the another function comprises issuing the filtered one or more I/O requests further down storage layers in the kernel space, and wherein filtered I/O completions are completed further up the storage layers in the kernel space.

2. The system of claim 1, wherein the processor is programmed to perform the function in user space to filter input/output (I/O) commands in the user space to identify at least one of the I/O commands, and wherein the processor is further programmed to execute the identified at least one of the I/O commands in the kernel space upon completion of filtering the I/O commands.

3. The system of claim 2, wherein the I/O commands comprise at least one of a storage command, a memory command, or a network command.

4. The system of claim 1, wherein the processor is further programmed to close the upcall mode after completion of the function in the user space.

5. The system of claim 1, wherein the upcall mode is a first upcall mode and the thread is a first thread, wherein the processor is further programmed to initialize a second upcall mode from a second thread executing in the user space.

6. The system of claim 1, wherein the processor is programmed to initialize the upcall mode by registering the upcall mode with the thread.

7. A method comprising:
initializing, by an operating system from a thread executing on a computing device, a second kernel stack separate from a first kernel stack, the operating system having a user space and a kernel space;
performing, by the operating system from the thread executing in the kernel space using the first kernel stack, a non-blocking upcall to execute a function in the user space, wherein performing the non-blocking upcall comprises filtering one or more input/output (I/O) requests from the same thread in the user space;
responsive to the function executing in the user space, performing at least one additional function in the kernel space using the initialized second kernel stack; and
upon completion of the upcall, continuing execution of the same thread in the kernel space using the first kernel stack, wherein continuing execution of the thread comprises issuing the filtered one or more I/O requests down storage layers in the kernel space, and wherein filtered I/O completions are completed up the storage layers in the kernel space.

8. The method of claim 7, wherein performing the additional functions comprises performing the additional functions in the kernel space using the second kernel stack in response to a system call from the function executing in the user space.

9. The method of claim 7, wherein performing the additional functions comprises performing the additional functions in the kernel space using the second kernel stack in response to an interrupt from the function executing in the user space.

10. The method of claim 7, wherein the operating system executes the function in the user space in an unrestricted execution context.

11. The method of claim 7, wherein the thread is associated with a process, and wherein performing the non-blocking call occurs in response to a command programmed in the process.

12. The method of claim 7, further comprising holding system resources across the upcall.

13. The method of claim 12, upon premature termination of the upcall, further comprising: switching from the second kernel stack to the first kernel stack; and returning an error to indicate to the thread to trigger release of the system resources.

14. The method of claim 12, wherein holding the system resources comprises placing a lock on the system resources to prevent use of the system resources by another thread.

15. One or more computer-readable storage media including computer-executable instructions that, when executed, cause at least one processor to perform synchronous execution of a user space operation without a thread switch from a kernel context by:
initializing, by an operating system executing on a computing device, an upcall mode from a user space for a thread;
allocating an upcall kernel stack, separate from a current kernel stack, in response to initializing the upcall mode;
performing, by the operating system on demand from the same thread from kernel space, an upcall function in the user space, wherein execution of the upcall function in the user space comprises filtering one or more input/output (I/O) requests from the thread using a user space stack, and wherein the operating system executes, using the allocated upcall kernel stack, kernel space functions generated by the upcall function; and
returning to the kernel space upon completion of the upcall function to perform another function from the same thread in the kernel space using the current kernel stack, wherein performing the another function comprises issuing the filtered one or more I/O requests further down storage layers in the kernel space, and wherein filtered I/O completions are completed further up the storage layers in the kernel space.

16. The computer storage media of claim 15, wherein the computer-executable instructions cause the processor to perform the upcall function in the user space by switching the operating system from one context protection layer to another context protection layer.

17. The computer storage media of claim 15, wherein the computer-executable instructions further cause the processor to prevent the upcall function from executing recursively.

18. The computer storage media of claim 15, wherein the computer-executable instructions cause the processor to limit performance of the upcall function to one upcall function at a time.

19. The computer storage media of claim 15, wherein the computer-executable instructions further cause the processor to de-allocate the upcall kernel stack.

20. The computer storage media of claim 15, wherein the computer-executable instructions cause the processor to execute regular system kernel calls using the upcall kernel stack.

* * * * *